(12) United States Patent
Werner et al.

(10) Patent No.: US 10,422,619 B2
(45) Date of Patent: Sep. 24, 2019

(54) IDENTIFICATION OF GEOMETRIC DEVIATIONS OF A MOTION GUIDE IN A COORDINATE-MEASURING MACHINE OR IN A MACHINE TOOL

(71) Applicant: Carl Zeiss Industrielle Messtechnik GmbH, Oberkochen (DE)

(72) Inventors: Elmar Werner, Oberkochen (DE); Andreas Fuchs, Westhausen (DE); Dominic Bulling, Eschach (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 361 days.

(21) Appl. No.: 15/477,522

(22) Filed: Apr. 3, 2017

(65) Prior Publication Data
US 2017/0241759 A1    Aug. 24, 2017

Related U.S. Application Data

(63) Continuation of application No. PCT/EP2015/073073, filed on Oct. 6, 2015.

(30) Foreign Application Priority Data

Oct. 7, 2014  (DE) ........................ 10 2014 220 313

(51) Int. Cl.
| | |
|---|---|
| *G01B 5/004* | (2006.01) |
| *G01B 21/04* | (2006.01) |
| *G05B 19/404* | (2006.01) |
| *B23Q 17/22* | (2006.01) |
| *G01B 5/20* | (2006.01) |
| *G01B 7/008* | (2006.01) |

(52) U.S. Cl.
CPC ............. *G01B 5/004* (2013.01); *B23Q 17/22* (2013.01); *G01B 5/20* (2013.01); *G01B 7/008* (2013.01); *G01B 21/042* (2013.01); *G01B 21/045* (2013.01); *G05B 19/404* (2013.01); *G05B 2219/37619* (2013.01); *G05B 2219/39021* (2013.01); *G05B 2219/49195* (2013.01); *G05B 2219/50139* (2013.01)

(58) Field of Classification Search
CPC ...................................................... G01B 5/004
USPC .................................................. 33/502, 503
See application file for complete search history.

(56) References Cited

U.S. PATENT DOCUMENTS

| | | |
|---|---|---|
| 3,555,254 A | 1/1971 | Gerber |
| 4,587,622 A | 5/1986 | Herzog |
| | (Continued) | |

FOREIGN PATENT DOCUMENTS

| | | |
|---|---|---|
| DE | 1 638 032 | 12/1971 |
| DE | 102 03 200 C1 | 8/2003 |
| | (Continued) | |

*Primary Examiner* — George B Bennett
(74) *Attorney, Agent, or Firm* — Harness, Dickey & Pierce, P.L.C.

(57) ABSTRACT

The invention relates to a method for identifying geometric deviations of a real motion guide from an ideal motion guide in a coordinate-measuring machine having a sensor for measuring a workpiece, or in a machine tool having a tool for processing a workpiece, wherein the coordinate-measuring machine or the machine tool has a movable part which is guided along the motion guide and by the motion guide.

9 Claims, 5 Drawing Sheets

(56) References Cited

U.S. PATENT DOCUMENTS

| | | |
|---|---|---|
| 7,069,174 B2 | 6/2006 | Santic |
| 7,669,344 B2 | 3/2010 | MacManus et al. |
| 7,788,820 B2 | 9/2010 | Aubele et al. |
| 7,905,031 B1* | 3/2011 | Paulino ................ G01B 21/04 |
| | | 33/503 |
| 2003/0236645 A1 | 12/2003 | Santic |
| 2009/0172962 A1 | 7/2009 | Aubele et al. |
| 2009/0307915 A1* | 12/2009 | Sutherland ........... G01B 21/042 |
| | | 33/502 |
| 2010/0119104 A1* | 5/2010 | Mamour .............. G01B 5/0032 |
| | | 382/100 |
| 2015/0052769 A1* | 2/2015 | Noda .................. G01B 21/047 |
| | | 33/503 |
| 2016/0102960 A1* | 4/2016 | Dolgikh ............... G01B 21/047 |
| | | 33/503 |
| 2016/0195382 A1* | 7/2016 | McMurtry ........... G01B 21/045 |
| | | 33/503 |
| 2018/0283840 A1* | 10/2018 | Tobiason ............... G01B 5/008 |

FOREIGN PATENT DOCUMENTS

| | | |
|---|---|---|
| DE | 10 2006 023 031 A1 | 11/2007 |
| DE | 10 2008 024 444 A1 | 12/2009 |
| DE | 10 2008 063 236 A1 | 6/2010 |
| DE | 10 2012 207 388 A1 | 11/2013 |
| EP | 0 082 441 | 6/1983 |
| JP | 9-141815 | 6/1997 |

* cited by examiner

IDENTIFICATION OF GEOMETRIC DEVIATIONS OF A MOTION GUIDE IN A COORDINATE-MEASURING MACHINE OR IN A MACHINE TOOL

CROSS-REFERENCE TO RELATED APPLICATION

The present application is a continuation of International PCT application PCT/EP2015/073073, filed Oct. 6, 2015, which claims priority to German application No. DE 10 2014 220 313.9, filed Oct. 7, 2014. The entire contents of these priority applications are incorporated herein by reference.

BACKGROUND OF THE INVENTION

The invention relates to a method for identifying geometric deviations of a real motion guide from an ideal motion guide in a coordinate-measuring machine having a sensor for measuring a workpiece, or in a machine tool having a tool for processing a workpiece, wherein the coordinate-measuring machine or the machine tool has a part which is movable along the motion guide. The part can be in particular one where, during its movement, the sensor or the processing tool is moved. Alternatively, it can be a part which can be moved independently of the sensor or the processing tool. One example is a rotary table on which the workpiece that is to be measured or processed is arranged. The invention furthermore relates to an arrangement for identifying such geometric deviations in a coordinate-measuring machine or in a machine tool. The invention additionally relates to a coordinate-measuring machine or to a machine tool having said arrangement. The motion guide can be for example a linear guide for guiding the movement of the part along a linear axis. Alternatively, the guide may for example be one which guides the movement of the part about a rotary axis.

Coordinate-measuring machines (CMM) typically have at least one sensor which is movable relative to a workpiece that is to be measured. The sensor can be a probe, for example a stylus, with which the workpiece is probed while being in contact therewith, i.e. in tactile fashion. The sensor can be arranged at a measuring head which provides in accordance with the tactile probing measurement signals, from which, in particular in combination with current positions of the movable parts of the CMM, the coordinates of the probed workpiece are calculated. Alternatively, the sensor can be a probe of the switching type. The sensor can, as a further alternative, be a different sensor, for example an optical sensor or a capacitive sensor. In machine tools, at least one processing tool is present with which a workpiece can be processed.

Frequently, the sensor or the processing tool is movable with the result that the position and/or alignment thereof relative to the workpiece is settable. Alternatively or additionally, a holder or support for the workpiece is movable, with the result that the position and/or alignment thereof relative to the sensor or the processing tool is settable. Examples are measurement tables which are movable in two mutually perpendicular linear directions (so-called cross tables) and rotary tables. In all these cases, motion guides are used with the purpose of performing the movement reproducibly along the movement path defined by the respective motion guide.

Guidance defects of the motion guide can be in particular production defects of the motion guide and/or be caused by deformations of the motion guide during operation. Guidance defects can be given in accordance with the six degrees of freedom of the movement of a body as linear guidance defects with respect to the three axes of a Cartesian coordinate system and as rotational guidance defects with respect to said three axes. For measuring these components of the guidance defect, one or more measurement methods and corresponding measurement devices can be used.

DE 10 2012 207 388 A1 discloses a method for ascertaining geometric defects of a coordinate-measuring machine. A sensor arrangement held by the CMM records measurement values of the geometric defect by moving and measuring a planar calibration surface having raised edges, which is arranged on the movable measurement table of the CMM. The present invention can also use measurement values which are recorded in this manner.

For correcting the guidance defects, it is known in coordinate-measuring machines (CMM) to use the CAA (computer aided accuracy) method. In a calibration, measurement values of the geometric deviation of the real motion guide (i.e. in the actual state of the motion guide during the calibration) from an ideal motion guide (i.e. the motion guide as it would be without guidance defect, for example exactly linear or exactly in the form of a circular line) are recorded. Corresponding correction values are ascertained therefrom and provided in a data store for correction purposes. The guidance defect is recorded, for example, using a measurement device having a laser interferometer or, specifically in the case of torsion guidance defects, using a measurement device having electronic inclination sensors. Ball plates and/or perforated plates or other calibration standards, which can be scanned in particular by the sensor of the coordinate-measuring machine, can also be used for recording the guidance defects. For correcting elastic bending portions of the guides, the so-called surface CAA is also known.

The CAA correction model is based on the assumption that the guidance defects are stable in the long run, i.e. are the same at the time when the defect is recorded and at the time when the workpiece is measured, with it being possible for a several months or years to have passed between said time points.

In coordinate-measuring machines and machine tools, guidance changes also occur, however, over time, for example due to foundation subsidence effects, and during operation, for example due to weight forces of the workpiece or due to temperature changes. These effects are dependent on time and are not stable in the long run like the guidance defects corrected by way of the CAA. They are referred to as dynamic guidance changes or dynamic guidance defects. For this reason, there is a need for repeating or at least checking the calibration. The outlay herefor should be low, since otherwise less time for operating the machine or the apparatus remains.

SUMMARY OF THE INVENTION

It is an object of the present invention to specify a method for identifying geometric deviations of at least one motion guide in a coordinate-measuring machine or in a machine tool, which method permits exact identification of the geometric deviations with little expenditure of time. Furthermore, it is an object of the present invention to specify an arrangement for performing the method. Furthermore, it is an object of the present invention to specify a machine tool or a coordinate-measuring machine having said arrangement.

The invention proceeds from the fact that during the measurement of the geometric deviation between the really present motion guide and the ideal motion guide, hysteresis effects occur and/or the temperature or temperature distribution influences the measured geometric deviations. In particular drives that drive the movement of the movable part result in hysteresis of the measured geometric deviations, because the geometric deviation is dependent on the direction in which the movable part is moved along the motion guide. If the temperature along the motion guide changes and as a consequence the temperature of the movable part changes during the movement along the motion guide, hysteresis of the measured geometric deviations occurs due to the thermal inertia of the movable part. As the movable part moves in a forwards direction along the motion guide, for example, the temperature increases, and as it moves in the reverse backwards direction, the temperature of the part decreases. Due to thermal inertia, the temperature of the part therefore differs at the same position along the motion guide during the movement in the forwards direction and backwards direction. If the temperature changes over time, an (e.g. arithmetic) average can be determined owing to the identification of the geometric deviations in each case during the movement of the part in the forwards direction and in the backwards direction. However, averaging is also appropriate on account of the hysteresis.

The method according to the invention therefore processes measurement values during the movement of the movable part in the forwards direction and subsequently during the movement of the movable part in the opposite backwards direction. In particular, the movable part is repeatedly stopped during the movement in the respective direction, and at least one measurement value of the geometric deviation is recorded at the respective position. By stopping the movement and preferably after a waiting period has passed before the at least one measurement value of the geometric deviation is recorded, it is possible to significantly increase the accuracy in the determination of the geometric deviation. Due to the waiting period, the amplitude of any occurring mechanical vibrations significantly decreases. The movable part also has time during the waiting period to adapt its temperature to the local temperature of the motion guide, or vice versa.

For recording the measurement values of the geometric deviation at a large number of positions along the motion guide, a significant amount of time is thus necessary for at least one reason: Due to hysteresis effects, the movable part is moved in the forwards direction and in the backwards direction, and the geometric deviation is determined in each case at a large number of positions. Preferably, a waiting period furthermore elapses at the individual positions before the geometric deviation is recorded.

In order to ascertain the average of the geometric deviation in each case at specific positions of the movable part along the motion guide, it is possible in the simplest case for the measurement values of the geometric deviations to be recorded at the same positions both during the forwards movement and during the backwards movement. In that case, measurement values from the process of the forwards movement and the backwards movement for the same positions along the motion guide are available. The average is e.g. the arithmetic average. However, this procedure during the recording of the geometric deviations takes up a lot of time.

In order to save time and/or to increase the accuracy of the ascertainment of the geometric deviations, a proposal is made for no measurement value of the geometric deviation to be recorded during the forwards movement and/or during the backwards movement at an intermediate position that is located between two measurement positions, wherein at least one measurement value of the geometric deviation is recorded at this intermediate position during the movement in the opposite direction. By way of example, no measurement value is therefore recorded at a first intermediate position during the process of moving the movable part in the forwards direction, but a measurement value is recorded at the first intermediate position during the movement of the part in the opposite, backwards direction. Preferably there are a plurality of intermediate positions each during the forwards movement and during the backwards movement where no measurement value is recorded. Therefore, there is a large number of first intermediate positions during the forwards direction at which no measurement value is recorded, whereas at least one measurement value of the geometric deviation is recorded at each of said first intermediate positions during the backwards direction. Vice versa, there is a large number of second intermediate positions during the movement in the backwards direction at which no measurement value is recorded, whereas at least one measurement value was recorded at the second intermediate positions during the forwards movement. In the profile of the motion guide to a first intermediate position, preferably a second intermediate position follows, before another first intermediate position is reached, and so on. The first and second intermediate positions therefore alternate in sequence. However, different distributions of the first and second intermediate positions are possible.

If one measurement value is/was recorded at the respective intermediate position in the reverse movement direction, this alternatively or additionally applies to the first measurement positions during the movement in the forwards direction and the second measurement positions during the movement in the backwards direction. In this case, the first and second measurement positions also alternate with one another in the profile of the motion guide. However, this is only one preferred embodiment. It is for example also possible for two second measurement positions each to follow two first measurement positions in the profile of the motion guide, followed in turn by two first measurement positions, and so on. Alternatively, it is possible for example for one second measurement position to follow in each case two first measurement positions, and then again for two first measurement positions to follow, or for a first measurement position to follow two second measurement positions and then again for two second measurement positions to follow, and so on.

However, in all these cases, at least one intermediate position is present, and therefore at least one measurement value at this position is present from only the process of the movement of the movable part in the opposite direction. The invention is here based on the finding that an (in particular arithmetic) average of the geometric deviation between the process of the forwards movement and the backwards movement can also be ascertained at the intermediate positions and/or in the region around the intermediate positions. To save time during the recording of the measurement values, it is therefore possible for example for measurements of the geometric deviation in the forwards direction and/or the backwards direction to be omitted that are not omitted in the above-mentioned simplest procedure. Alternatively, the accuracy during the identification of the geometric deviations can be increased by recording in each case at least one measurement value of the geometric deviation in the forwards direction and/or in the backwards direction at additional measurement positions as compared to the simplest procedure. These two options can also be combined with one another. Compared to the simplest procedure, the average step width between the first measurement positions during the forwards movement and the average step width of the second measurement positions during the backwards movement can thus be increased, while still increasing the accuracy during the identification of the geometric deviations.

The first measurement positions from the process of the movement in the forwards direction and the second measurement positions from the process of the movement in the backwards direction are in particular in each case support points of a profile of the measurement values of the geometric deviation. The profile can in each case be expressed by way of a mathematical function of the measurement values that are recorded at the measurement positions as a function of the location, specifically the position along the motion guide. The recording of the measurement values in the forwards direction therefore gives a first profile of the measurement values or a first mathematical function, and the recording of the measurement values in the backwards direction gives a second profile or a second mathematical function. If not just in each case one measurement value is recorded at the measurement positions, but a plurality of measurement values which contain for example measurement information relating to various degrees of freedom (see above) of the geometric deviation, a large number of profiles or mathematical functions are accordingly obtained, in particular one profile relating to one of the degrees of freedom. By way of example, during the forwards movement and during the backwards movement, one profile of the geometric deviation is obtained relating to a first direction transversely to the profile of the motion guide, and one profile of the geometric deviation is obtained relating to a second direction transversely to the direction of the motion guide, wherein the first direction and the second direction are in particular perpendicular to one another.

During averaging of the geometric deviation of the profile in the forwards direction and of the profile in the backwards direction, generally only the average relating to the same degree of freedom of the geometric deviation is formed. This is not necessarily the case, however. By way of example, it is possible to calculate, for a plurality of degrees of freedom, in each case separately for the forwards direction and the backwards direction, a model of the geometric deviation from the measurement values and to then calculate the average between the models.

In all these cases, what is preferred is that a profile of the averages of the geometric deviation is calculated from the profile of the geometric deviation during the movement in the forwards direction and from the profile of the geometric deviation during the movement in the backwards direction (and optionally also from at least one further profile of the geometric deviation during the movement in the forwards direction or backwards direction). Since there is at least one first intermediate position in the profile relating to the forwards direction and/or at least one second intermediate position in the profile relating to the backwards direction at which no measurement value was recorded, the profile at least at the intermediate position and/or in the region of the intermediate position can be based on interpolation of the measurement values at neighbouring measurement positions of the profile. In the simplest case, this can be a linear interpolation. Alternatively, other conventional methods of interpolation known from mathematics or physics can be used.

It is furthermore optionally possible to perform not only one process of the movement of the movable part in the forwards direction and/or in the backwards direction, but a plurality of such processes, and to record at least one measurement value of the geometric deviation at the measurement positions in each case. Ultimately, a plurality of profiles of the geometric deviation along the motion guide are therefore available for the forwards direction and/or the backwards direction. The profile of the averages of the geometric deviation can then be calculated from said plurality of profiles for the respective movement direction and from at least one profile for the opposite movement direction. It is preferred here for the measurement positions of the various profiles not to be identical with respect to the same movement direction. Rather, in at least one of the profiles there exists an intermediate position at which no measurement value was recorded, but at which for another one of the profiles with respect to the same movement direction a measurement value was recorded. As for the possibilities of selecting measurement positions and intermediate positions of the profiles with respect to the same movement direction, the same applies in particular as was described previously or will be described for the intermediate positions and measurement positions with respect to the mutually opposite movement directions.

Said averages or said profile of the averages is/are preferably output in the form of correction information for correcting the geometric deviation and stored in particular in a data memory in the form of information for a CAA. In particular, the controller of a coordinate-measuring machine or of a machine tool can use said averages or the profile of the averages and correct the geometric deviation in a manner which is known per se.

In particular, the processing steps of the interpolation and/or forming of the averages can be performed using a computer program. The computer program optionally runs on a computer of the controller or a separate evaluation device.

In particular, the following is proposed: a method for identifying geometric deviations of a real motion guide from an ideal motion guide in a coordinate-measuring machine having a sensor for measuring a workpiece, or in a machine tool having a tool for processing a workpiece, wherein the coordinate-measuring machine or the machine tool has a part which is movable along the motion guide and by the motion guide, wherein the movable part is moved in a forwards direction along the motion guide, and in each case one measurement value of the geometric deviation is recorded at a plurality of first positions of the movable part with respect to the motion guide, with the result that a first group of measurement values is recorded, the movable part is moved in a backwards direction, which runs opposite to the forwards direction, along the motion guide, and in each case one measurement value of the geometric deviation is recorded at a plurality of second positions of the movable part with respect to the motion guide, with the result that a second group of measurement values is recorded, during the recording of the first group of measurement values, no measurement value is recorded at at least one first intermediate position which is situated between two of the first positions at one of the second positions, and/or wherein during the recording of the second group of measurement values, no measurement value is recorded at at least one second intermediate position which is situated between two of the second positions at one of the first positions, for each first position and for each second position, an average of the geometric deviation of the motion guide is calculated from the profile of the first group of measurement values along the motion guide and from the profile of the second group of measurement values along the motion guide, and in this way a group of averages is formed which are the averages of the geometric deviations when moving the movable part in the forwards direction and in the backwards direction.

Furthermore, an arrangement is proposed for identifying geometric deviations of a real motion guide from an ideal motion guide in a coordinate-measuring machine having a sensor for measuring a workpiece, or in a machine tool having a tool for processing a workpiece, wherein the arrangement for performing the method in one of the described configurations has a measurement device and an identification device, wherein the measurement device is configured to record at least the first group and the second group of measurement values, and the identification device is configured to form the group of averages and to identify therefrom the geometric deviations.

Additionally proposed is a coordinate-measuring machine or a machine tool having said arrangement and a controller that is configured to control a movement of the movable part in the forwards direction and in the backwards direction along the motion guide and to output the first and second positions to the identification device.

The calculation of the average of the geometric deviation for each first position and for each second position is preferably performed such that a (for example arithmetic) average is formed at each first position and at each second position. If an intermediate position of the profile of the geometric deviation from the process of the movement in the opposite movement direction is located at one of the first positions or at one of the second positions, an interpolation is preferably performed. Several possibilities exist in this respect. In the simplest case, as mentioned above, the profile of the measurement values that has the intermediate position is interpolated, and the average is then formed. However, the average can alternatively be obtained for example directly from measurement values of the geometric deviation, without prior calculation of an interpolated value. In this case, for example the measurement values that are located next to the intermediate position are weighted less than the measurement value at the intermediate position. This principle of less weighting concerns the individual neighbouring measurement values. Overall, however, the neighbouring measurement values are preferably incorporated in the average calculation with the same weighting as the measurement value at the position. A still further possibility of interpolation by way of prior smoothing of a difference between the profiles in the forwards direction and backwards direction will be mentioned below.

In addition to the already mentioned advantages, the principle of recording measurement value profiles with intermediate positions has an additional advantage that is associated with the advantage of a shorter measurement time: Since less time is required, temporal temperature fluctuations can effect the accuracy of the average formation to a lesser degree.

In particular, the movable part can be moved repeatedly in the forwards direction and/or in the backwards direction along the motion guide, and a measurement value of the geometric deviation can be recorded at a plurality of third positions with respect to the movement of the movable part in the forwards direction and/or at a plurality of fourth positions with respect to the movement of the movable part in the backwards direction and in each case with respect to the motion guide, with the result that a third and/or fourth group of measurement values is recorded, and wherein the group of averages (and preferably also the profile thereof along the motion guide) is also formed in dependence on the profile of the third and/or fourth group of measurement values.

Aspects of the repetition of the process of the movement of the movable part in the forwards direction and/or backwards direction and recording of a plurality of profiles of the geometric deviation with respect to the same movement direction have already been discussed. By forming the averages, in particular random (non-systematic) errors during the measurement value recording are averaged out.

During the recording of the third group of measurement values, preferably no measurement value is recorded at at least one third intermediate position which is situated between two of the third positions at one of the first positions, and/or during the recording of the fourth group of measurement values, no measurement value is recorded at at least one fourth intermediate position which is situated between two of the fourth positions at one of the second positions. In this way, time is saved and/or the accuracy is increased even with respect to the recording of the profiles in relation to the same movement direction.

It is possible for a step width of constant size to be located in particular between in each case two of a plurality of positions of at least one of the groups of measurement values, wherein in each case one of the intermediate positions is situated at one half of the step width of constant size. Said positions of the group of measurement values are the measurement positions. The intermediate positions are thus situated in each case in the centre between two neighbouring measurement positions. It is preferred for the measurement positions of the other groups of measurement values also to have the same step width of constant size, wherein the measurement positions and intermediate positions of the different groups are arranged, as described above, in each case in alternating fashion. With respect to the first and the second group of measurement values, this means that a first measurement position is followed by a first intermediate position, which is identical to one of the second measurement positions, and a first measurement position follows again, which is identical to one of the second intermediate positions, and so on. The principle of the step width of constant size and optionally also of the alternating arrangement of measurement positions and intermediate positions preferably applies to all measurement positions of the groups or profiles of measurement values, with the positions at the ends of the profiles being able to be exceptions thereto, however. The marginal positions (which are formed by the starting and end positions of the profiles) of the different profiles are preferably identical and the marginal positions of each of the profiles are preferably measurement positions. In at least one of the profiles, the marginal position is therefore followed by a measurement position, before an intermediate position follows. In at least one other of the profiles, the marginal position is therefore followed by an intermediate position and then by a measurement position. Alternatively to the measurement values at the marginal positions in all profiles, it is possible for no measurement value to be recorded at least for one of the profiles, similar to the case of an intermediate position. In order to have a value for further processing and in particular for forming an average at this position, it is possible for an extrapolation of the profile to be performed.

According to one preferred embodiment, a smoothed profile of differences of the profiles of the first group and of the second group along the motion guide is calculated, wherein the group of averages is formed from values of the smoothed profile of differences.

In particular, the smoothed profile of differences can be used directly for forming the profile of the averages. The smoothed profile of differences has, at least at some of the measurement positions of the first group and of the second group or in the region of said measurement positions, values, obtained from the smoothing, for the difference between the profile of the first group and the profile of the second group of measurement values. It is possible at least at these supporting points for the associated average between the profiles of the first and second groups (and optionally of further groups, see above) to be calculated in a simple manner due to the fact that the average lies in each case at half the values of the smoothed profile of differences.

The smoothed profile of differences and in particular said supporting points can, however, also be used in a different fashion for forming the group of averages. If more than one profile of measurement values relating to at least one of the movement directions is present, there are a plurality of possibilities for forming the smoothed profile of differences. By way of example, it is possible to initially calculate from the different profiles relating to the same movement direction an averaged profile relating to said movement direction. The resulting averaged profile can then be used like a single measured profile. Alternatively, in each case one profile of differences or a smoothed profile of differences of the profiles can be formed for different pairs of profiles relating to the forwards direction and the backwards direction (for example separately for the first group and the second group and separately for the third and fourth groups). If initially in each case a profile of differences, which has not yet been smoothed, is formed, said profiles can either initially be smoothed separately and then for example an average of the smoothed profiles can be formed, or initially an average of the profiles is formed which is then smoothed. However, it is not mandatory for the smoothed profile of differences to be formed by initially forming a non-smoothed profile of differences. It is rather also possible for the profiles of the first group and of the second group (and optionally of further groups) or the corresponding averaged profiles for multiple forwards and backwards movements to be initially smoothed, and then for the difference of the smoothed profiles to be formed as a smoothed profile of differences.

Smoothing of a profile of measurement values, averages or differences can be performed using the conventional methods known in mathematics or statistics. By way of example, a moving Gaussian filter can be applied to the profile. Alternatively, a polynomial function or splines can be fitted into the profile to be smoothed.

It is preferred that a profile of the differences along the motion guide is formed initially by calculating differences of the profiles of the first group and of the second group, and then for the smoothed profile of differences to be formed by smoothing the profile of the differences. This correspondingly also applies if in each case a plurality of profiles of measurement values or groups are present for the individual movement directions. As already described above, it is possible in particular for a profile of the differences to be initially formed in a different fashion and for the profile to be subsequently smoothed.

A preferred manner of forming interpolated values at intermediate positions will be described below. Here, the smoothed profile of differences is used. In this way, the advantages of the smoothing are combined, specifically the compensation of random errors during the measurement, and of the measurement positions present in the profiles, specifically obtaining the measurement information. Ultimately, the required interpolation at the intermediate positions is obtained. What is proposed for this reason is that an interpolated value of the profile of the group of measurement values is formed at the respective intermediate position of a group of measurement values (for example of the first group or the third group or a group having averages of said groups) by offsetting the value (in particular measurement value) of a different group (for example the second group or the fourth group or a group having averages of said groups) at the intermediate position by the absolute value of the smoothed profile of differences at the intermediate position. The offset performed is of course performed from the profile or the value of the other group in the direction of the profile of that group at the intermediate position of which the interpolated value is to be formed.

The manner of forming interpolated values that was described above does not rule out that values which are interpolated in a different manner were already formed at intermediate positions in a preceding step, in particular for the purpose of forming the difference of the profiles. However, it is preferred for the profile of the averages to be calculated from the interpolated values that were formed using the smoothed profile of differences.

BRIEF DESCRIPTION OF THE DRAWINGS

Exemplary embodiments of the invention will be described below with reference to the accompanying drawing. In the figures.

DETAILED DESCRIPTION OF THE PREFERRED EMBODIMENTS

Figure 1:
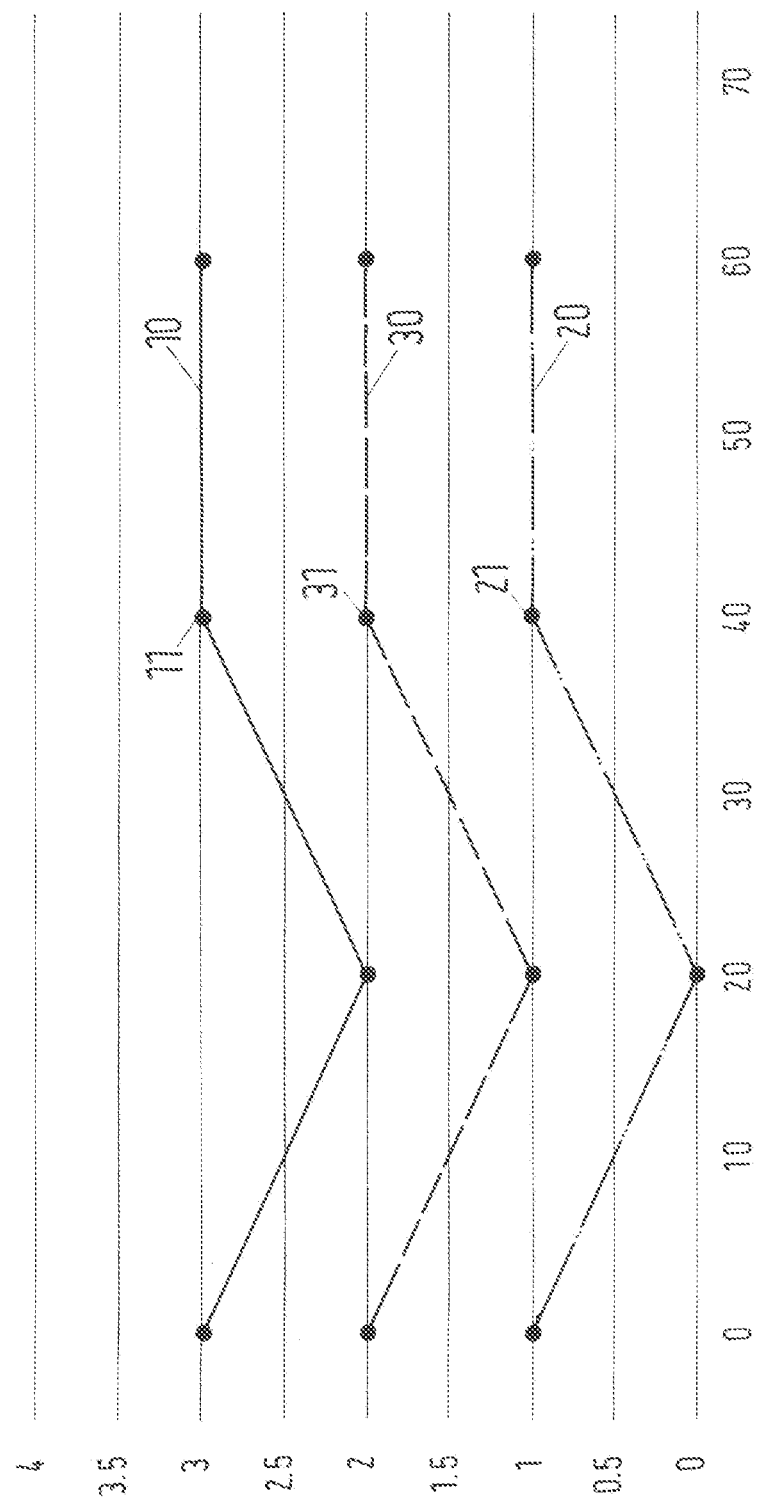
FIG. 1 shows two profiles for the geometric deviation of a guide, which were not obtained according to the method according to the invention, for the forwards and backwards directions and a profile of averages from the two profiles.

FIG. 1 shows an example of measured profiles (forwards direction at the bottom, backwards direction at the top), in which, at all measurement positions relating to the motion guide (in the example only four measurement positions), measurement values of the geometric deviation were recorded both during the movement in the forwards direction and also during the movement in the backwards direction. In contrast to the method of the present invention, no intermediate positions therefore exist at which measurement values were recorded for only one movement direction. The profile of the arithmetic average of the measurement values is situated between the measured profiles. The position along the guide is plotted (in the exemplary embodiment in millimeters) on the horizontal axis of the diagram. The geometric deviation relating to one degree of freedom is plotted (in the exemplary embodiment in micrometers) on the vertical axis. As in the following figures, this is a simplified example. In practice it is preferred for measurement values of the geometric deviation to be recorded at a considerably higher number of positions. This is true also if intermediate positions are present. The difference between the profiles of the measurement values generally is also not consistent, in particular owing to local and temporal temperature differences.

The profiles of the measured geometric deviations of the guide defect, which are illustrated in FIG. 1 and were obtained from measurements during the movement in the forwards and backwards direction, can also be referred to as forwards run 20 and backwards run 10. In the exemplary embodiment, the forwards run 20 and the backwards run 10 each have a constant step width of, for example, 20 mm between the measurement positions. The step width is the same for both profiles. The profile of the arithmetic averages 30, which were calculated from the measurement values of the forwards run 20 and the backwards run 10, is illustrated by a line which is situated centrally between the two lines for the forwards run 20 and the backwards run 10.

A detailed profile of the averages including more support points then in FIG. 1 could be obtained by way of reducing the step width of the measurement values for the forwards run and the backwards run. However, this unnecessarily increases the time expenditure. As will be described in more detail with reference to the following figures, it is also possible to obtain, with negligibly greater time expenditure for the measurements, a greater amount of measurement information from which a more detailed profile of the averages can be calculated.

Figure 2:
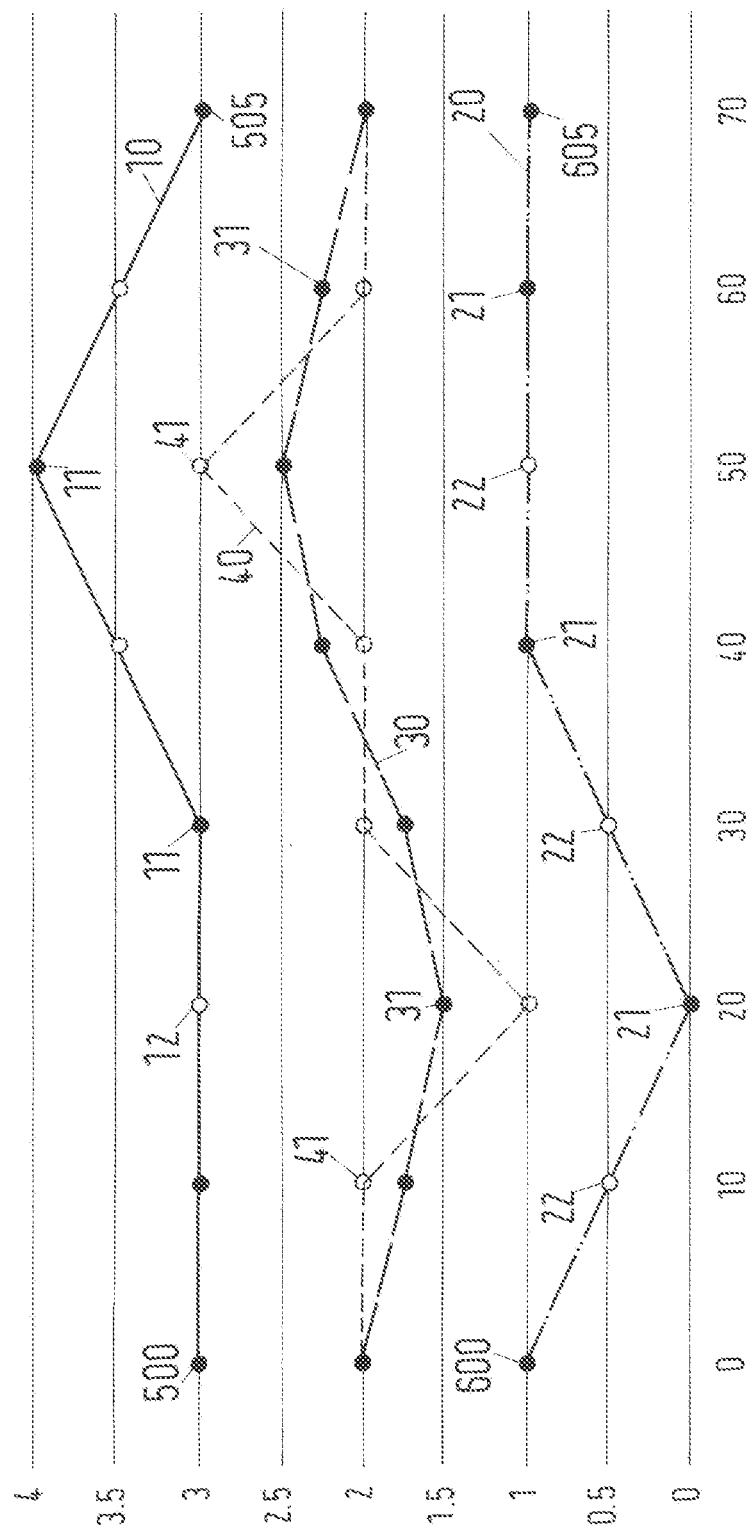
FIG. 2 shows profiles for the geometric deviation of a guide for the forwards and backwards directions of the movable part along the guide, a profile of averages from the profiles, and, as a reference, a profile of averages which would have been obtained if measurement values had also been recorded at the intermediate positions.

Similar to FIG. 1, FIG. 2 illustrates profiles of measurement values for opposite movement directions, specifically a forwards run 20 and a backwards run 10. The differences lie in a reduced step width between the support points and in that, both in the forwards run 20 and in the backwards run 10, an intermediate position 22 is situated between multiple pairs of neighbouring measurement positions 21 at which no measurement value was recorded, but at which the other profile does contain a measurement value. During the backwards run 10, a measurement is therefore carried out at positions 11 at which no measurement is carried out during the forwards run, and vice versa. It is possible in this way to save measurement time, because fewer measurement values are identified per profile than if a measurement were carried out at each position both in the forwards run and in the backwards run. The measurement information obtained overall is still not significantly less.

In the exemplary embodiment, an interpolated value of the profile 10, 20 is calculated at the intermediate positions 12, 22 in each case by forming the arithmetic average of the values at the two nearest neighbouring measurement positions 11, 21 of the profile. In this way, additional values for the forwards and backwards runs are obtained, which, although they are not measurement values, will with a high degree of probability deviate only slightly from measurement values. Due to the combination of the information obtained in the forwards run and backwards run, described below, the probability that the result does not significantly differ from the result which would have been obtained in the identification of measurement values at the intermediate positions furthermore increases. The result of the identification of the geometric deviation is obtained, in the example of FIG. 2, by forming the average of the values from the forwards run and the backwards run, taking into account the interpolated values at the intermediate positions.

In the case of FIG. 2, the measurement positions 11, 21 and the intermediate positions 12, 22 follow one another in alternating fashion both in the backwards run 10 and in the forwards run 20. Except for the marginal positions of the profiles, all measurement positions 11 of the backwards run 10 are also offset by one step width (which is equal to the position distance between two successive support points of the profiles) from the measurement positions 21 of the forwards run 20. Due to the alternating sequence of the measurement positions 11, 21 and of the intermediate positions 12, 22, the same is true for the intermediate positions 12, 22. As already described above, the intermediate positions in alternative embodiments can be offset from one another in another way, for example by more than one step width.

In the exemplary embodiment of FIG. 2, as in the exemplary embodiments of the following figures, only measurement positions are located at the starting positions 505, 600 and the end positions 500, 605 of the profiles. Extrapolation can therefore be avoided.

Two profiles 30, 40, illustrated in FIG. 2, are situated between the forwards run 20 and the backwards run 10. The profile 30 is the profile of the arithmetic averages 31 of the measurement values and the interpolated values of the forwards run 20 and the backwards run 10. The profile 40, illustrated in dashed lines, is a reference profile. The values 41 thereof were formed from arithmetic averages of a forwards run, not illustrated in FIG. 2, and a backwards run, not illustrated in FIG. 2, which contain measurement positions instead of the intermediate positions 12, 22. By comparing the profile 30 with the reference profile 40, it is possible to assess the quality of the result that is obtained with the method according to the invention.

Figure 3:
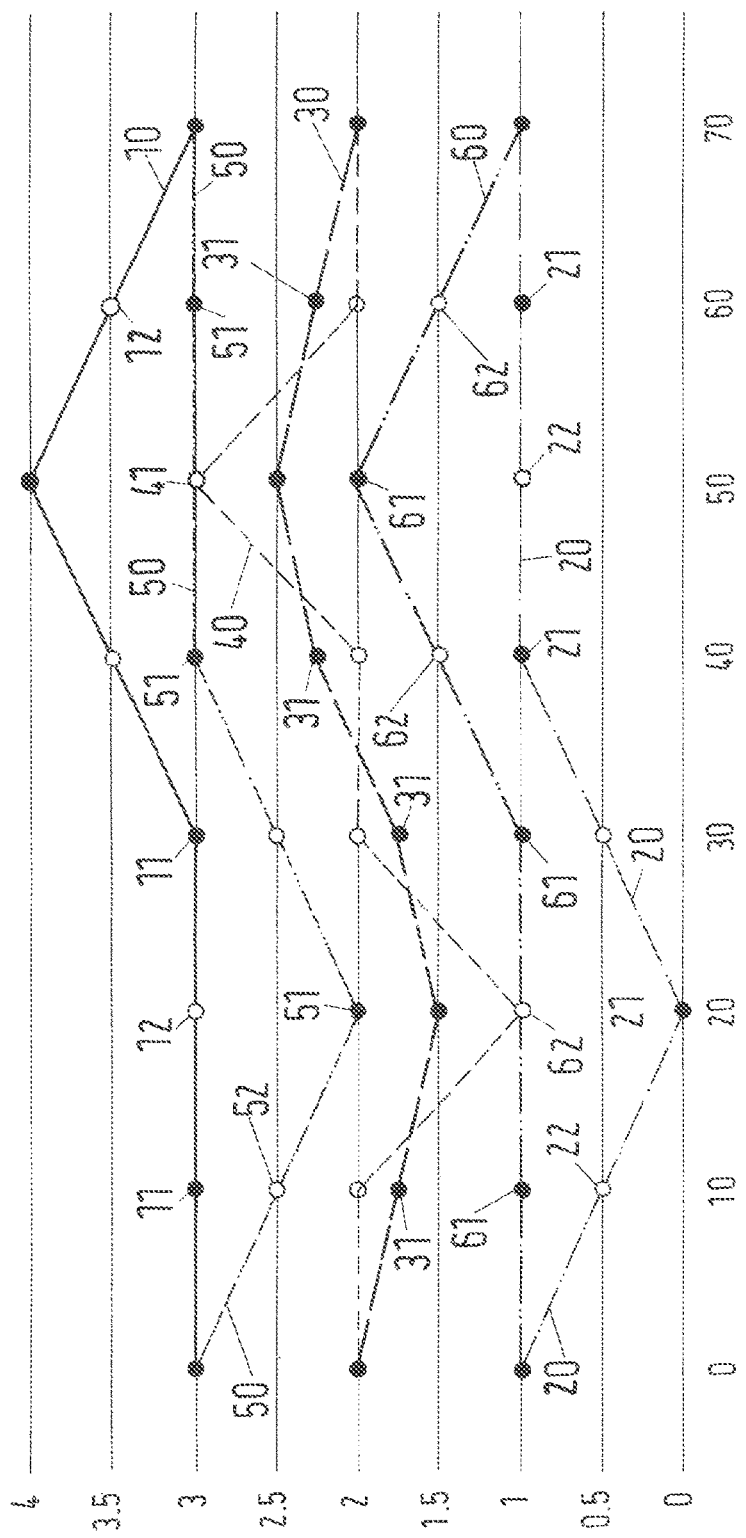
FIG. 3 shows profiles for the geometric deviation of a guide for a first forwards and backwards movement and for a second forwards and backwards movement of the movable part along the guide, a profile of averages from the profiles, and the reference profile from FIG. 2.

Overall, FIG. 3 shows four profiles 10, 20, 50, 60 including in each case measurement positions 11, 21, 51, 61 and intermediate positions 12, 22, 52, 62. The profiles 10, 20 are the forwards run 20 and the backwards run 10 from the exemplary embodiment of FIG. 2. However, after the first backwards run 10, a second forwards run 60 and thereafter a second backwards run 50 were recorded. In this case, the measurement positions and intermediate positions of the two forwards runs 20, 60 and the two backwards runs 10, 50 are arranged in alternating fashion in the same way and are offset from one another by a step width, as in the first forwards run 20 and the first backwards run 10.

The differences between the two forwards runs 20, 60 and the two backwards runs 10, 50 are based for example on a change of the temperature distribution along the motion guide. The profile 30 of the arithmetic averages between the first forwards run 20 and the first backwards run 10, and between the second forwards run 60 and the second backwards run 50, however, is identical in this exemplary embodiment. As in FIG. 2, the reference profile 40 of the averages 31 is illustrated as a dashed line.

The profile 30 of the arithmetic averages can be calculated in different ways. By way of example, first, an interpolated value is individually ascertained from the profile for the four profiles 10, 20, 50, 60 of the measurement values at each intermediate position. Next, in each case for the two forwards runs 20, 60 and the two backwards runs 10, 50, a profile of the averages thereof (not illustrated) at the support points of the measurement positions and of the intermediate positions is ascertained. By forming an average, the profile 30 is then ascertained from said profiles of the averages. Alternatively, after the interpolation at the intermediate positions, first in each case one profile of the arithmetic averages of the first forwards run 20 and of the first backwards run 10 and also of the second forwards run 60 and of the second backwards run 50 is ascertained. Next, the values of the two profiles of the averages are averaged, and the profile 30 is obtained.

Figure 4:
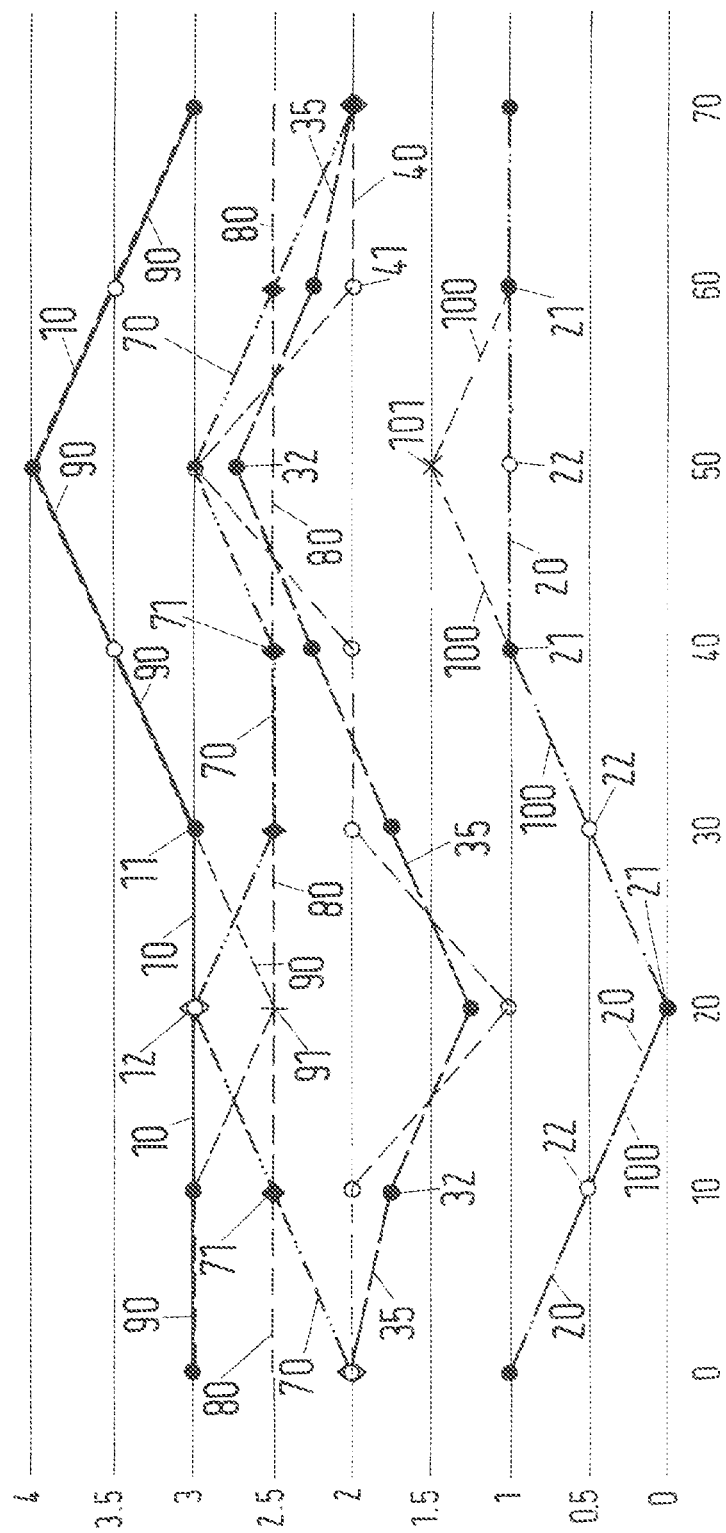
FIG. 4 shows profiles for the geometric deviation of a guide for a forwards and backwards movement of the movable part along the guide, a profile of difference values of the profiles, a smoothed profile of difference values, a profile of averages from the profiles, and the reference profile from FIG. 2.

As in FIG. 2 and FIG. 3, FIG. 4 illustrates the forwards run 20 and the backwards run 10. By way of the procedure described below, which includes extraction of long-period portions of the hysteresis effect of the forwards run and the backwards run, deviation from the reference profile of the averages is further reduced. Extracting the long-period hysteresis effects is achieved by low-pass filtering, which can also be referred to as smoothing. By way of smoothing, a smoothed profile of differences of the values of the forwards run 20 and of the backwards run 10 is calculated. A specific exemplary embodiment for the procedure will be described below, which contains the step of smoothing the profile of the differences of the values of the forwards run 20 and of the backwards run 10 to form the smoothed profile of differences.

First, in each case one interpolated value of the profile 10, 20 is ascertained at the intermediate positions, as already described with reference to FIG. 2. Next, for each support point of the profiles 10, 20, i.e. at the measurement positions and at the intermediate positions, the difference of the values of the profiles 10, 20 is formed. The resulting profile of the differences 71, illustrated by way of diamonds, is designated in FIG. 4 with the reference sign 70 using a dot-dashed line. It should be noted that, unlike the exemplary embodiment illustrated in FIG. 4, the profile of the differences does not need to be situated between the forwards run and the backwards run.

The profile 70 is now smoothed by applying a low-pass filter to the profile 70. The smoothed profile 80 of differences is obtained therefrom. In the exemplary embodiment, the profile 80 is a horizontal straight line, i.e. a straight line having constant values. This straight line is illustrated by way of dashes in FIG. 4.

Now, a value of the geometric deviation is again ascertained only at the intermediate positions 12, 22 of the backwards run 10 and of the forwards run 20. At the intermediate position 12, 22, the measured value of the other profile of measurement positions is for this purpose offset by the value of the smoothed profile 80 of differences. For the intermediate positions of the forwards run 20, this means that the measurement values of the backwards run 10 are reduced by the value of the smoothed profile 80 of differences. For the intermediate positions of the backwards run 10, this means that the measured value of the forwards run 20 is in each case increased by the value of the smoothed profile 80 of differences. In the illustrated exemplary embodiment, this procedure gives modifications with respect to the interpolated value that is ascertained directly from the profile 10, 20 only at two intermediate positions. The profiles 90, 100, which are obtained with the modified values at the intermediate positions, are illustrated in FIG. 4 by way of dashed lines. The only deviation between the forwards run 20 and the modified forwards run 100 is obtained at the third intermediate position from the left. Here, the modified value 101 is greater than the originally linearly interpolated value of the profile 20. The only deviation between the backwards run 10 and the modified backwards run 90 is situated at the third intermediate position from the right, which is identical to the second measurement position of the forwards run 20 and the third support point of the forwards run 20. At this position, the modified value 91 is less than the originally linearly interpolated value.

In the next step, the arithmetic average of the modified profiles 90, 100 is formed at each support point of the modified forwards run 100 and of the modified backwards run 90. Hereby, the profile 35 of arithmetic averages 32 is formed, which is illustrated in FIG. 4 by way of a dashed line. The reference profile 40 from FIGS. 2 and 3 is also illustrated in FIG. 4. By comparing the results of the exemplary embodiments according to FIG. 3 and FIG. 4 with the shared reference profile 40, it is easy to see that the formation of the smoothed profile 80 of differences and the inclusion of this smoothed profile 80 in the calculation of the values at the intermediate positions leads to a smaller deviation from the reference profile 40 and thus to a better result.

Higher-frequency deviations in the profile of the differences between the forwards run and the backwards run are based on random high-frequency measurement errors and short-period guide deviations. In contrast to the short-period guide deviations, which should also be identified completely if possible, the random high-frequency measurement errors should not contribute to the result of the identification of geometric deviations and should be kept low due to the measurement construction and optimization of the external conditions. Owing to the filtering described above, i.e. the smoothing, the high-frequency random errors occurring in the forwards run and backwards run are not extracted.

The random high-frequency errors are based for example on mechanical vibrations or other disturbances during the recording of the measurement values. When using a laser measurement device, for example, turbulences in the air volume through which the laser radiation passes can lead to such high-frequency disturbances.

In particular, the following methods can be used for smoothing the profile of the differences: adapting (fit) an n-th degree, e.g. third degree, polynomial, adapting (fit) splines, and/or forming a moving average.

The smoothed profile of differences can also be used if a plurality of forwards runs and a plurality of backwards runs are recorded, as for example in the exemplary embodiment of FIG. 3. In this case, for example in each case the difference between the first forwards run and the first backwards run and the second forwards run and the second backwards run and optionally in each case the difference between further forwards and backwards runs is formed. The profile of the differences is then in each case smoothed, and the modified values at the intermediate positions are formed. The further procedure as already described for the measured and interpolated profiles with reference to FIG. 3 can be subsequently effected with the resulting modified profiles.

By forming the smoothed profile of differences, for example the possible causes for the hysteresis between forwards runs and backwards runs, already mentioned above, are taken into account.

A further advantage of the introduced procedure is that said filtered information is used only for determining values at the intermediate positions from actually recorded measurement values of the respectively other profile. Therefore, no measurement information is lost. Information not present at the intermediate positions is supplemented by filtered information on the basis of the measurement values of the other profile.

The method according to the invention can be advantageously applied in various ways depending on the accuracy class of the machine (i.e. the coordinate-measuring machine or the machine tool). In machines having lower accuracy, greater temperature fluctuations should be expected, because typically no great effort is made to keep the temperature constant. However, if the step width is not reduced or reduced only by a small amount as compared to the conventional procedure (recording of measurement values both in the forwards run and also in the backwards run at each support point), but measurement values at intermediate positions in the forwards run and backwards run are not recorded, the overall time for the measurements can be shortened. For this reason, temperature fluctuations affect the result of the ascertainment of the geometric deviations to a lesser degree. However, in highly accurate machines for which, owing to corresponding measures, lower temperature fluctuations can be expected, the step width between the support points is reduced more strongly as compared to the conventional procedure, for example by providing in the forwards run and backwards run in each case additional measurement positions in alternating fashion at which, in the respectively other profile, an intermediate position is located. The overall measurement time is therefore increased only relatively slightly. The accuracy of the result of the ascertainment of the geometric deviations, however, is significantly improved. As already mentioned above, it is possible for both modifications in comparison with the conventional procedure to be combined with one another.

Figure 5:
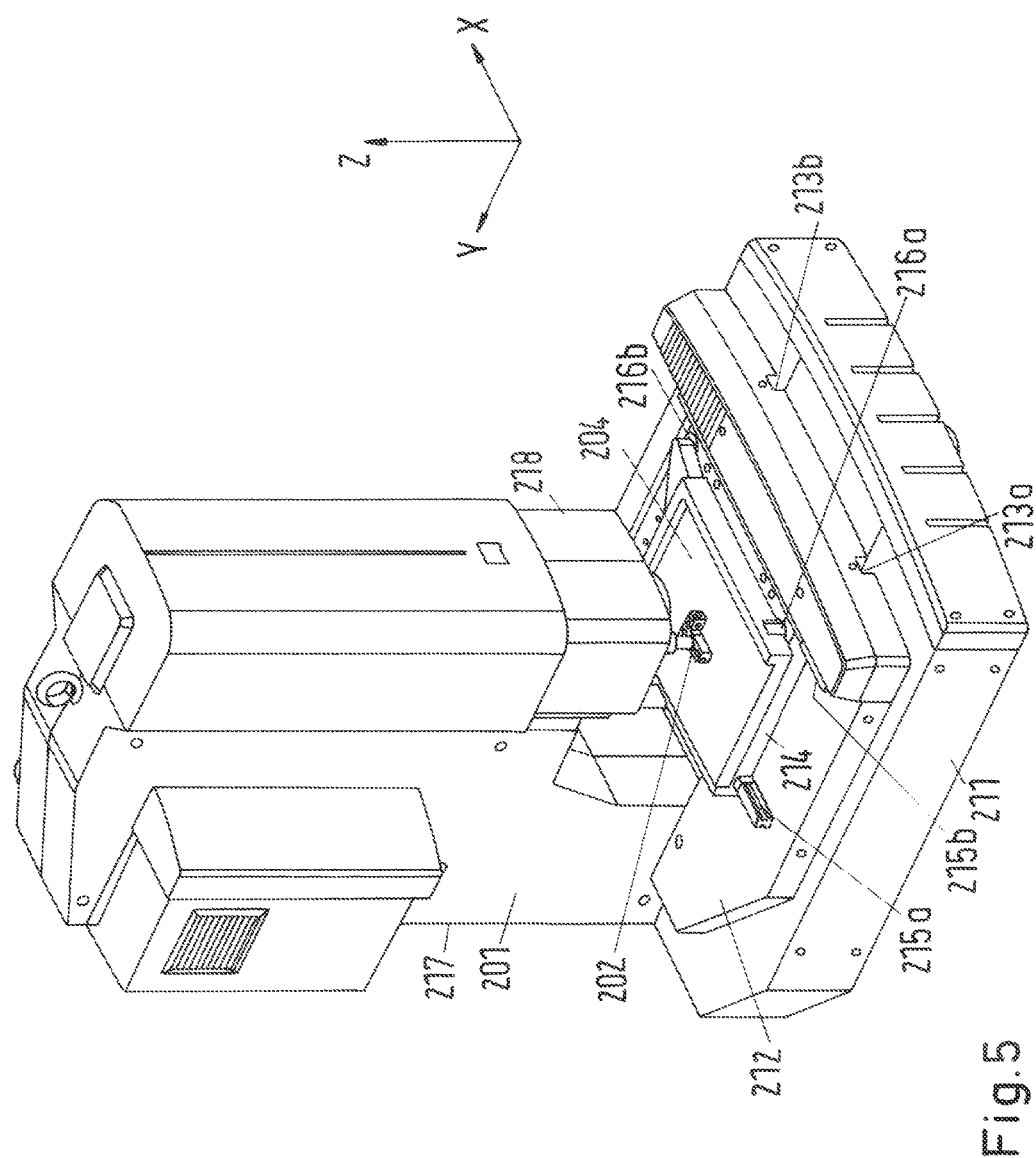
FIG. 5 shows a coordinate-measuring machine having a cross table and a holder, which is displaceable in the vertical direction, for holding a probe or a sensor arrangement.

The coordinate-measuring machine 201 illustrated in FIG. 5 is an example of a CMM, the geometric defects of which are ascertainable according to the present invention. Alternative constructions of coordinate-measuring machines having motion guides are for example CMMs of portal construction, gantry construction or articulated arm-type construction. The principle of the movable construction of machine tools can be the same as in CMMs.

The CMM 201 has a main body 211 which is placed, for example, on the ground and is not moved during the operation of the CMM 201. A Cartesian coordinate system X, Y, Z is illustrated on the right-hand side in FIG. 5. The surface of the main body 211 extends substantially in the X-direction and in the Y-direction. Arranged on the main body 211 is a carriage 212 which is movable along guides 213a, 213b, which extend in the Y-direction, relative to the main body 211 in the Y-direction. Arranged in turn on the carriage 212 is a measurement table 214, which is movable along guides 215a, 215b, which extend in the X-direction, relative to the carriage 212.

The movements of the carriage 212 and of the measurement table 214 are driven in particular via motor drives (not illustrated). The measurement table 214 and the carriage 212 together with the guides 213, 215 and the drives in this way form a cross table.

Arranged on the measurement table 214 is a calibration standard 204 which has a planar calibration area, the upper surface of which extends in the X-direction and Y-direction. In the exemplary embodiment, the calibration standard 204 is placed on a surface of the measurement table 214 via a three-point bearing. In FIG. 5, two placement points 216a, 216b of the three-point bearing can be seen.

The CMM 201 additionally has a stand 217 which has, at its region which in FIG. 5 faces forward and to the right, a slide 218 which is movable in the Z-direction. In the state illustrated in FIG. 5, a holder of the slide 218 for example holds a measuring head (not visible in FIG. 5), to which in turn a sensor arrangement 202 is coupled. This sensor arrangement 202 has a plurality of sensors for determining coordinates of surface points of the calibration standard 204, in particular distance sensors. In the illustrated exemplary embodiment, the holder of the slide 218 and/or the measuring head is rotationally movable about the Z-axis, with result that the sensor arrangement 202 can be rotated about the Z-axis.

For recording the measurement values for the geometric deviation of the above-mentioned guides 215a, 215b, the measurement table 214 is moved in the X-direction such that the calibration standard 204 likewise moves in the X-direction. Here, the sensor arrangement 202 is arranged at the lateral raised edge of the calibration standard 204, located on the right at the front, and measures the distance from the surface of the raised edge. If the geometry of the calibration standard 204 is known and/or corresponding correction values for taking into account deviations of the geometry of the calibration standard 204 from an ideal geometry are known, the geometric defect of the guide can be ascertained from the distance measurement.

The invention claimed is:

1. A method for identifying geometric deviations of a real motion guide from an ideal motion guide in a coordinate-measuring machine having a sensor for measuring a workpiece, or in a machine tool having a tool for processing a workpiece, wherein the coordinate-measuring machine or the machine tool has a movable part which is guided along the motion guide and by the motion guide, including the steps of:

moving the movable part in a forward direction along the motion guide, and recording in each case one measurement value of the geometric deviation at a plurality of first positions of the movable part with respect to the motion guide, with the result that a first group of measurement values is recorded, moving the movable part in a backward direction, which runs counter to the forward direction, along the motion guide, and recording in each case one measurement value of the geometric deviation at a plurality of second positions of the movable part with respect to the motion guide, with the result that a second group of measurement values is recorded, wherein during the recording of the first group of measurement values, no measurement value is recorded at at least one first intermediate position which is situated between two of the first positions at one of the second positions, and/or wherein during the recording of the second group of measurement values, no measurement value is recorded at at least one second intermediate position which is situated between two of the second positions at one of the first positions, and for each of the first positions and for each of the second positions, calculating an average of the geometric deviation of the motion guide from the profile of the first group of measurement values along the motion guide and from the profile of the second group of measurement values along the motion guide, and forming a group of averages which are the averages of the geometric deviations when moving the movable part in the forward direction and in the backward direction.

2. The method according to claim 1, wherein the movable part is moved repeatedly in the forward direction and/or in the backward direction along the motion guide, and in each case a measurement value of the geometric deviation is recorded at a plurality of third positions with respect to the movement of the movable part in the forward direction and/or at a plurality of fourth positions with respect to the movement of the movable part in the backward direction and with respect to the motion guide, such that a third and/or fourth group of measurement values is recorded, and forming the group of averages in dependence on the profiles of the third and/or fourth group of measurement values.

3. The method according to claim 2, wherein during the recording of the third group of measurement values, no measurement value is recorded at at least one third intermediate position which is situated between two of the third positions at one of the first positions, and/or during the recording of the fourth group of measurement values, no measurement value is recorded at at least one fourth intermediate position which is situated between two of the fourth positions at one of the second positions.

4. The method according to one claim 1, wherein a step width of constant size is located between in each case two of a plurality of positions of at least one of the groups of measurement values, and wherein in each case one of the intermediate positions is situated at one half of the step width of constant size.

5. The method according to claim 1, wherein a smoothed profile of differences of the profiles of the first group and of the second group along the motion guide is calculated, and wherein the group of averages is formed from values of the smoothed profile of differences.

6. The method according to claim 1, wherein a profile of the differences along the motion guide is formed initially by calculating differences of the profiles of the first group and of the second group, and then forming the smoothed profile of differences by smoothing the profile of the differences.

7. The method according to claim 6, wherein an interpolated value of the profile of the first group of measurement values is formed at the at least one first intermediate position by offsetting the measurement value of the second group at the first intermediate position by the absolute value of the smoothed profile of differences at the first intermediate position and/or wherein an interpolated value of the profile of the second group of measurement values is formed at the at least one second intermediate position by offsetting the measurement value of the first group at the second intermediate position by the absolute value of the smoothed profile of differences at the second intermediate position.

8. An arrangement for identifying geometric deviations of a real motion guide from an ideal motion guide in a coordinate-measuring machine having a sensor for measuring a workpiece, or in a machine tool having a tool for processing a workpiece, wherein the arrangement for performing the method according to claim 1 has a measurement device and an identification device, wherein the measurement device is configured to record at least the first group and the second group of measurement values, and the identification device is configured to form the group of averages and to identify therefrom the geometric deviations.

9. A coordinate-measuring machine or a machine tool having the arrangement according to claim 8 and further comprising a controller that is configured to control a movement of the movable part in the forward direction and in the backward direction along the motion guide and to output the first and second positions to the identification device.

* * * * *